United States Patent
Duncan

[15] 3,665,686
[45] May 30, 1972

[54] TWO ROW WINDOW HARVESTER

[72] Inventor: Richard A. Duncan, Thibodaux, La.
[73] Assignee: The Thomson Machinery Company, Inc., Thibodaux, La.
[22] Filed: Aug. 14, 1969
[21] Appl. No.: 850,179

[52] U.S. Cl. .................................56/11.3, 56/14.3, 56/14.5, 56/15.7, 56/15.9
[51] Int. Cl. .............................................A01d 45/10
[58] Field of Search................56/16, 17, 59, 157, 14.3, 14.5, 56/14.9, 11.3, 15.7, 15.9

[56] References Cited

UNITED STATES PATENTS

| | | | |
|---|---|---|---|
| 2,621,461 | 12/1952 | Tiedtke | 56/16 X |
| 2,724,228 | 11/1955 | Duncan | 56/17 |
| 3,307,338 | 3/1967 | Mizzi | 56/16 |
| 3,492,798 | 2/1970 | Hart | 56/17 |

*Primary Examiner*—Louis G. Mancene
*Assistant Examiner*—J. N. Eskovitz
*Attorney*—Ralph R. Browning

[57] ABSTRACT

Cane harvesting equipment is provided which comprises a tractor and means for supporting harvesting equipment on the tractor. The means for supporting the harvesting equipment includes a support member which is pivotally connected to the rear of the tractor and extending to the front thereof to permit raising and lowering its front portion carrying; the harvesting equipment and permit tilting from side to side. A cable is attached to the support in front of the pivotal attachment of the support to the tractor. The cable is hydraulically operated for lifting and lowering the front end portion of the support which carries the harvesting equipment. A second cable which is counterbalanced is also attached to this forward portion of the support. Preferably three or more wheels are pivotally mounted on the support for gauging the height of the cane cutting means. The gauge wheels are individually adjustable for height. An adjustably inclined pivotally mounted cane conveyor is mounted on the support behind cane pick-up means and adapted to move the cut cane laterally to the side of the harvester. A screw conveyor suspended for horizontal and vertical adjustment above the cane cutting means may be provided for moving the tops of cut cane in the same lateral direction that the cane is moved on the conveyor. Each of the several operating parts of the harvesting equipment supported on the front of the support is either mechanically or hydraulically operated. A single clutch drives both the hydraulic and mechanical equipment so that disengagement of the clutch stops both.

16 Claims, 11 Drawing Figures

Patented May 30, 1972

Richard A. Duncan
INVENTOR

BY Ralph C. Browning
ATTORNEY

Patented May 30, 1972

Richard A. Duncan
INVENTOR

BY Ralph R. Browning
ATTORNEY

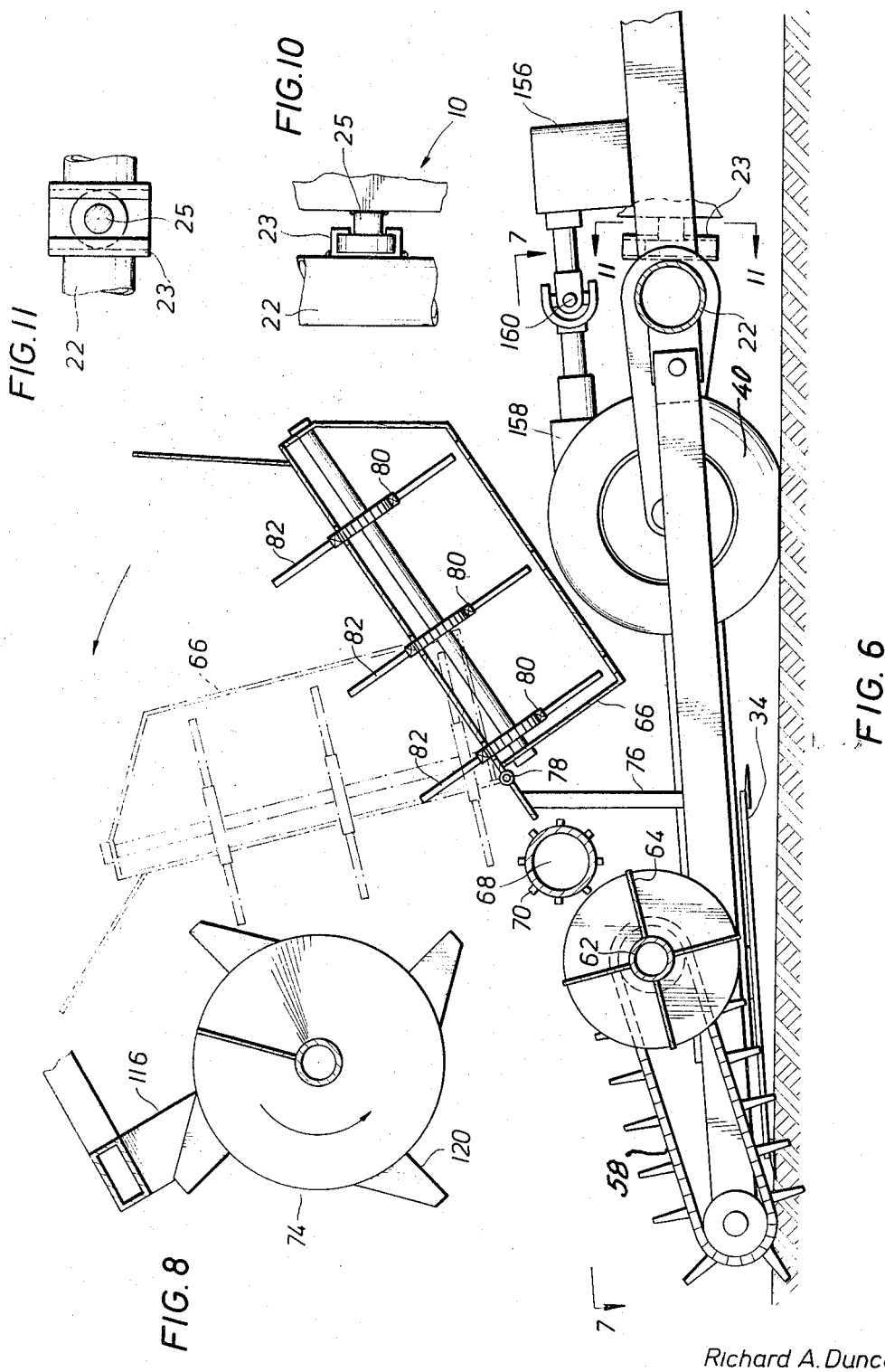

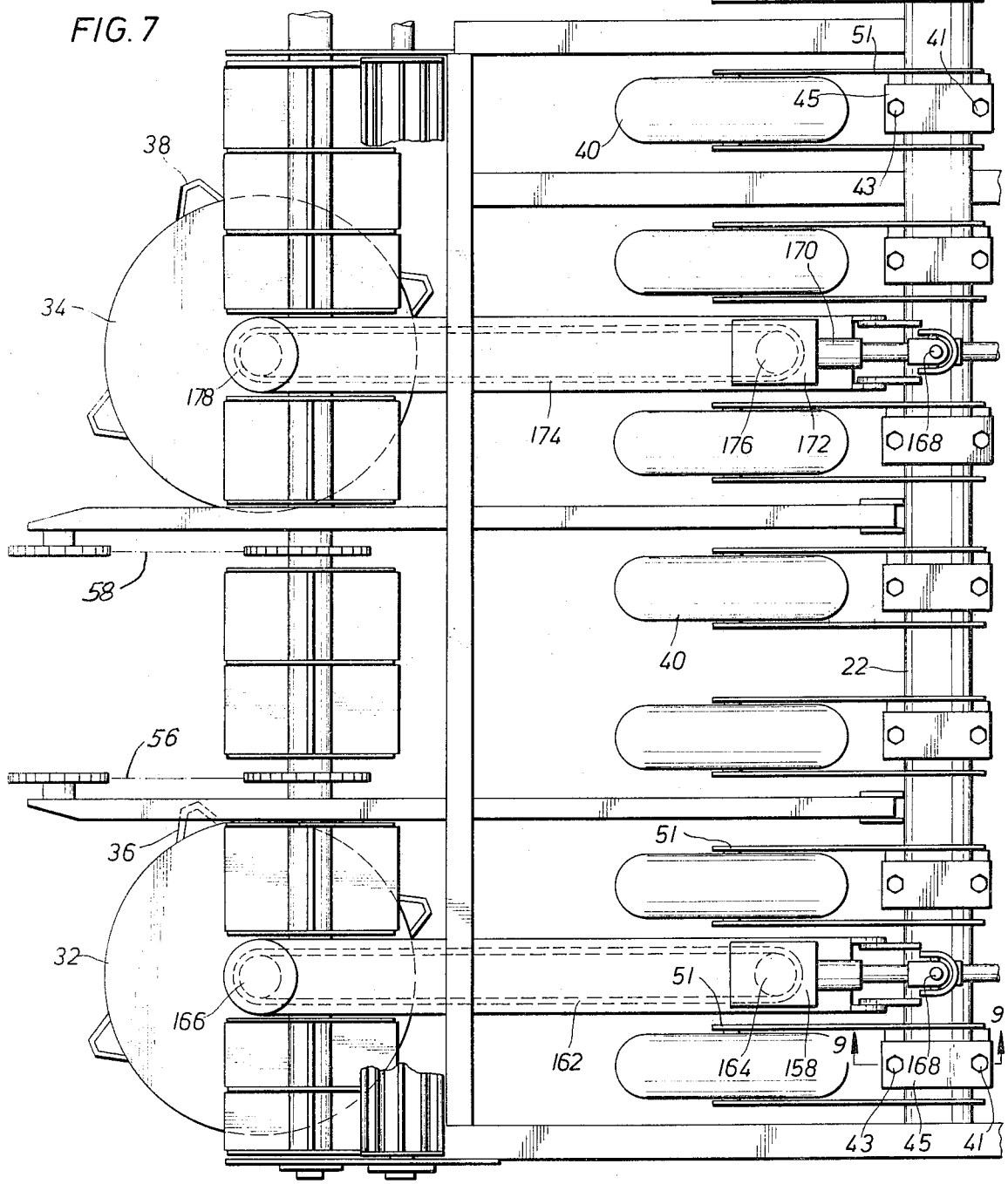
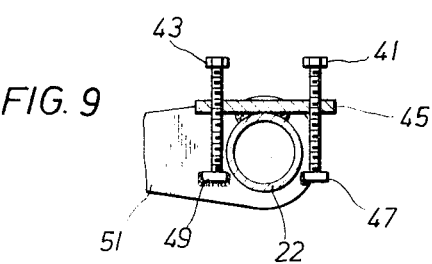

TWO ROW WINDOW HARVESTER

BACKGROUND OF THE INVENTION

This invention is a new and improved tractor mounted cane harvester for cutting a plurality of rows of cane simultaneously and depositing the cane in a windrow.

Cane harvesting equipment for cutting two rows of cane simultaneously requires a very heavy equipment on the harvester support for efficient cutting of the two rows. The harvesting equipment must be lifted off the ground for transportation and of course lowered onto the ground for the harvesting operations. Also, it is likely that the ground level of the two rows of cane will not be the same height. A harvester which is not automatically adjusted to solve the problem of cutting two rows of cane each having a different height would not be very acceptable.

It is an object, therefore, of this invention to provide a cane harvesting system or harvester which includes means for lifting the heavy equipment for transportation and lowering this equipment for harvesting operations and also permits the automatic slanting of the means for supporting the harvester when the harvester is used to cut two rows of different fields elevations.

Many currently used cane harvesters have heavy harvesting equipment supported in front of a tractor. Often a part of this equipment, such as the cutter gauge wheels, have a tendency to dig into the ground during the harvesting operations. This of course is undesirable and interferes with the efficiency of the harvesting or may cause the harvesting to be discontinued entirely.

It is a further object, therefore, of this invention to provide a cane harvester including structure for counterbalancing at least a portion of the heavy weight of the harvesting equipment extending in front of the tractor to thereby minimize the digging of the gauge wheels into the ground during harvesting.

The furrow between the two rows to be cut and the furrows outside of these rows may not be the same depth. It has been found that a superior cane harvesting machine can be provided the industry if a plurality (at least three) of gauge wheels each of which are individually adjustable are used.

As the two rows of cane are cut, the cut cane is moved laterally across a cane conveyor and heaped in a windrow aside from the tractor. It has been found that an inclined cane conveyor the incline of which is preferable adjustable, works better than a non-adjustable, conveyor. Cane stands at different inclinations in the field. If the cane is inclined away from the front of the mechanism, then it would not fall as far back on the conveyor as it is cut and the conveyor needs to be in a more forwardly tilted position. If the cane is inclined toward the machine as it moves forward, the conveyor must be in a less forwardly tilted position.

It is therefore a further object of this invention to provide a cane harvesting system including an inclined conveyor which may be adjusted to different inclinations to handle cane which stands at different inclinations in the field. It is a further object of this invention to provide structure which may be required for certain types of standing cane for moving the tops of the cane laterally in the same direction as the lateral movement of the cane on the adjustable inclined cane conveyor.

The heavy harvesting equipment such as the pick-up chains, pick-up rollers, transfer roller, conveyors, and means for moving the tops of the cane laterally are operated by either mechanical or hydraulic means. In case of an emergency or for any other reason, it would be highly desirable to be able to operate a single mechanism from the tractor and stop the operation of all of the harvesting equipment simultaneously. It is a still further object of this invention, therefore, to provide a means which may be operated with a single movement of the arm of the operator to immediately stop the operation of all mechanical and hydraulic operating means for operating the various equipment in the harvester.

Further objects of this invention will become apparent upon a further reading of the following brief description and detailed description of the invention.

Briefly described the invention in a preferred embodiment comprises a tractor to which is attached pivotally and slantingly a harvesting equipment support such as a frame entirely surrounding the tractor. The means for connecting the frame to the tractor may, for example, be a cross piece in the frame having a slot extending vertically through the cross piece with a draw bar pin on the tractor extending through the slot and cross piece and thereby serving as a coupling member.

A cable attached to the forward portion of the frame is hydraulically operated for lifting the forward portion of the frame for transportation and for lowering the cutters on the ground for harvesting, respectively. A second cable is also attached to the forward portion of the frame and means for counterbalancing the weight of the harvesting equipment on the forward portion of the frame is connected to the other end of the second cable. The counterbalance may, for example, be a heavy platform extending rearwardly from the tractor with a heavy ballast on the heavy platform. The counterbalancing effect of the heavy platform and the ballast aids in the support of the forward portion of the frame and decreases the required lifting force of the lifting and lowering cable. The counterbalance also minimizes the digging of the gauge wheels into the ground during the harvesting operation.

At least three laterally spaced gauge wheels are mounted on the frame for gauging the height of the cane cutters mounted in front of the frame. Means are provided for individually adjusting the pivotal positions of each of the gauge wheels. The cane cutting means, preferably two laterally spaced apart cane cutters, are mounted across the front of the frame. Behind the cane cutters, cane pick-up means such as a pick-up roller is also mounted on the support. Behind the cane pick-up means and a transfer drum is mounted the improved inclined cane conveyor. The inclined cane conveyor is adapted to move cut cane laterally to the side of the harvester and is pivotally mounted on a pivot support member on the frame behind the cane pick-up roller. The inclined cane conveyor can therefore be adjusted to correct for different inclinations in the cane as it stands in the field.

A screw conveyor may be supported on the frame at a position above the cutters and adapted to move the tops of the cane laterally in the same direction as the lateral movement of the cane on the inclined cane conveyor. The screw conveyor is supported by a screw conveyor support which in turn is connected to a pair of booms pivotally attached to a pair of masts extending upwardly from the sides of the frame. The booms are pivoted about the masts by hydraulic means interconnecting the booms and the masts. Also, means are provided for extending the outer ends of the booms from the mast connection or retracting the outer ends of the bins toward the masts connection. This provides for adjustment of the position of the screw conveyor to accommodate cane of different height.

A single line shaft is driven by the tractor power take-off. The line shaft is operatively associated with all the mechanical and hydraulic means for operating the harvesting equipment supported on the frame in front of the tractor. A clutch for engaging the tractor power take-off in the line shaft is positioned so that disengagement of the clutch causes both the mechanical means and the hydraulic means to stop.

The invention as well as its many advantages may be further understood by reference to the following detailed description and drawings, it being understood that the detailed description sets out a specific example of the invention and modifications may be made without departing from the scope of the invention.

FIG. 6 is an enlarged side elevational view partly in section taken along line 6—6 of FIG. 3 and enlarged;

FIG. 7 is an enlarged plan view of the front section of the harvester taken along line 7—7 of FIG. 6;

FIG. 8 is an enlarged sectional view through the screw conveyor of the system.

FIG. 9 is a fragmentary view, partly sectional and partly elevational, of an adjustable gauge wheel mounting;

FIG. 10 is a fragmentary plan view of the coupling to the tractor at the front thereof; and FIG. 11 is a sectional view along the line 11—11 of FIG. 6.

Figure 1:
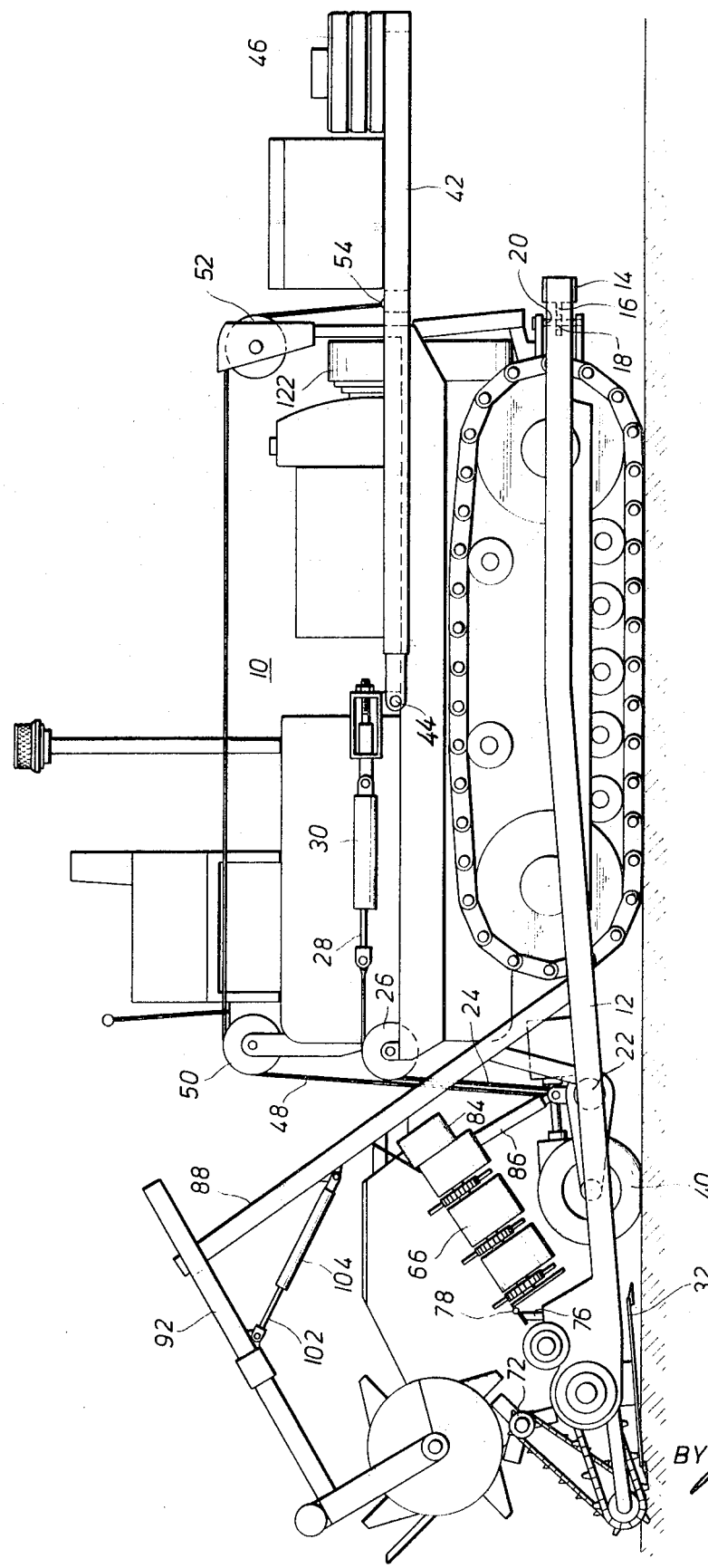
FIG. 1 is a side elevational view of the left side of the cane harvesting equipment.
Figure 2:
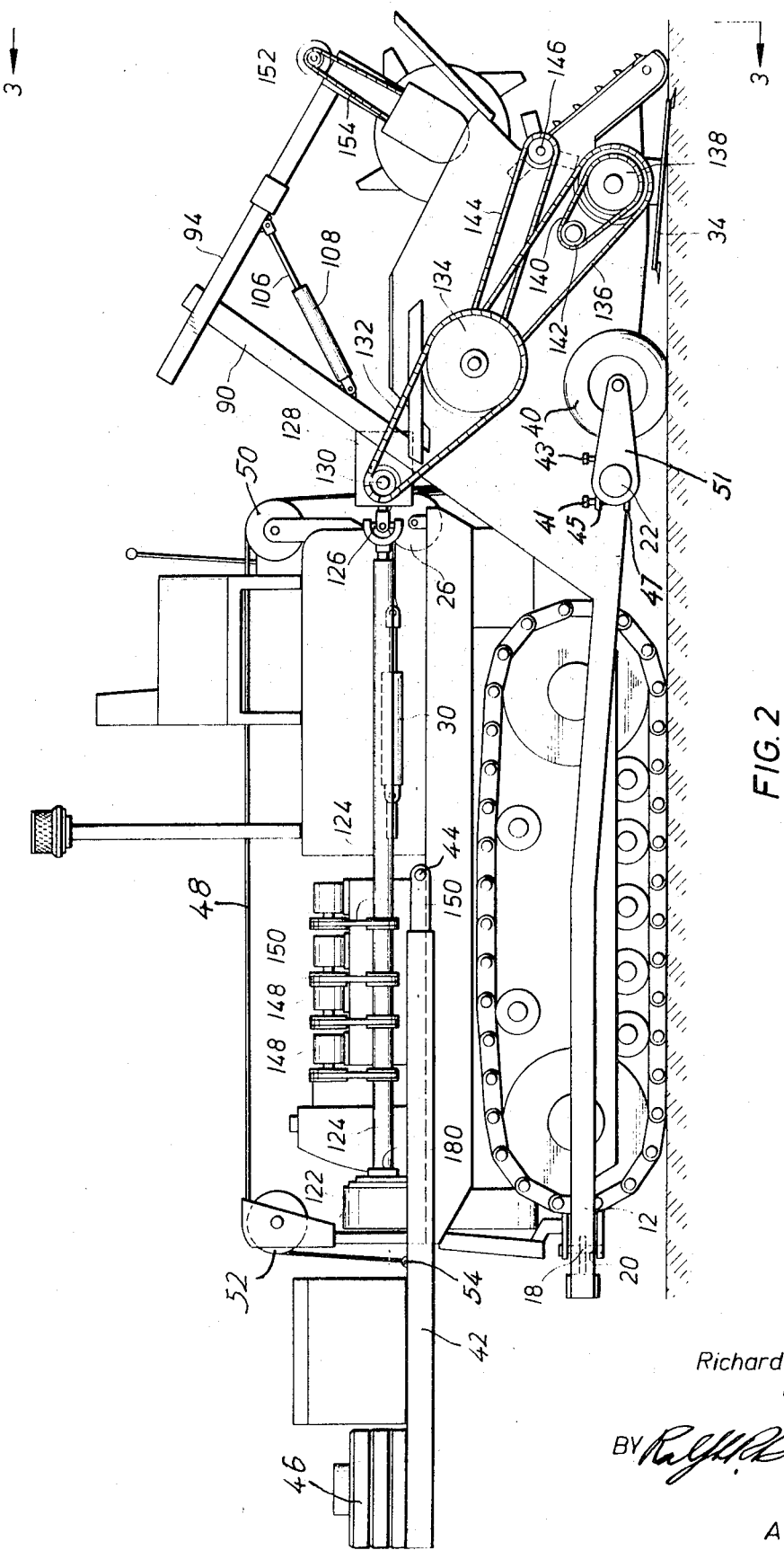
FIG. 2 is a side elevational view of the right hand side of the cane harvester equipment.

Referring to the drawings and more particularly to FIG. 1 and FIG. 2, the cane harvesting system or equipment includes a tractor indicated generally by the numeral 10 to which is secured a frame 12 which completely surrounds the tractor. The rear of the frame 12 is provided with a cross piece 14 from which projects forwardly a horizontally extending coupling member 16 provided with a slot 18 extending vertically entirely through the horizontal coupling member 16. The draw bar pin 20 of the tractor 10 extends through the slot 18 and serves as the second coupling member. Slot 18 is made much larger than the diameter of draw bar pin 20 so that draw bar pin 20 fits loosely through the slot 18.

It can be seen that the rear of the tractor 10 (through the draw barcross piece coupling) moves the frame 12. The unique coupling arrangement also permits up and down movement of the front of the frame 12 on which is supported the harvesting equipment so that the heavy equipment on the front of the frame 12 may be lifted during transportation and lowered during the harvesting. The unique coupling arrangement also permits a certain amount of turning movement of the frame 12 about the axis of the drawbar pin 20. Also, the coupling arrangement permits the frame 12 to slant sideways when the front part of the frame is forced to slant when the field elevation of the two rows of cane are not the same.

A cross bar or shaft 22 (see FIG. 7) extends across the frame 12 adjacent the front of the tractor 10. A cable 24 (see FIG. 1) is connected to the cross bar and extends from the cross bar over a sheave 26 mounted on the front of the tractor 10. The other end of the cable 24 is attached to hydraulic ram 28 operated by hydraulic cylinder 30. Thus, the operator may operate the hydraulic system of the tractor to retract the ram 28 into cylinder 30 thereby raising the forward end of the frame 12. The operator hydraulically extends the ram 28 out from cylinder 30 to lower the front of frame 12.

As seen in FIGS. 10 and 11, a channel guide 23 is carried vertically on one of the members of the frame 12 and the tractor such as frame member 22, and a T-head slide 25 interengages therewith and mounted on the other member such as the tractor, serve to prevent the front of the frame 12 from swinging laterally while permitting its up and down movement.

Figure 3:
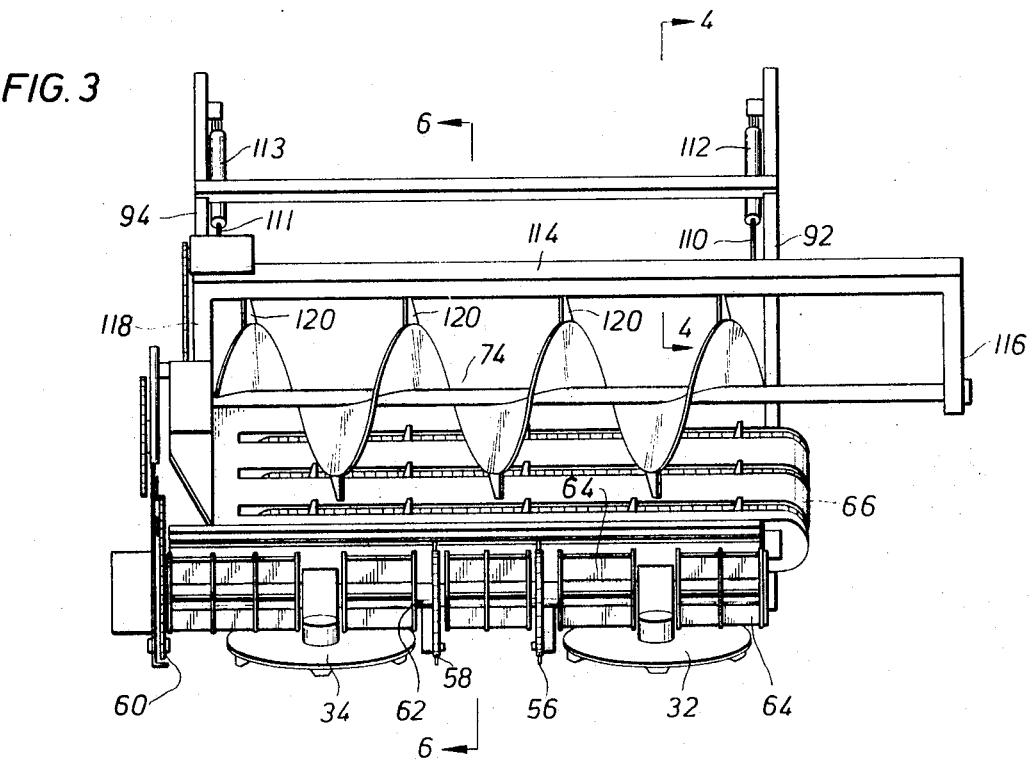
FIG. 3 is a front view of the cane harvesting equipment and taken along line 3—3 of FIG. 2.
Figure 4:
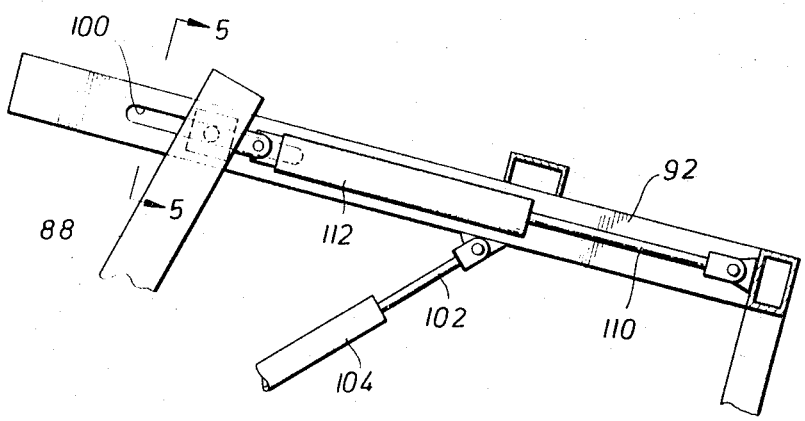
FIG. 4 is a view partly in section taken along line 4—4 of FIG. 3.

Referring particularly to FIG. 3 and FIG. 7, a pair of rotatable discs 32 and 34 are mounted on the front of the frame 12. Cane cutting members 36 and 38 are mounted on rotatable discs 32 and 34, respectively. A plurality of gauge wheels 40 are adjustably pivoted on the cross bar 22. (See FIG. 7). In the embodiment shown, there are eight gauge wheels 40. However, if desired fewer than eight gauge wheels may be used, but for most efficient operation of a large cane harvester for simultaneously cutting at least two rows of cane it is desirable that at least three such pivotally mounted gauge wheels be utilized.

The wheels so mounted may be adjusted upward or downward by manipulating set screws 41 and 43 carried in a plate 45 welded to shaft 22 and bearing against plates 47 and 49 welded to wheel-carrying arms 51.

Referring again to FIG. 1 and FIG. 2, a heavy metal platform 42 is connected to the tractor 10 at fulchrum 44 and extends rearwardly from the tractor. Heavy weights 46 are stacked on the outer edge of the heavy platform 42.

A second cable 48 is connected to the cross piece 22 located near the front of the tractor. Cable 48 extends from cross piece 22 over the sheave 50 mounted on the front of the tractor then to sheave 52 mounted on the back of the tractor and finally to platform 42 where it is connected at connection 54. Thus, the heavy weight of the platform 42 and heavy weights 46 exert a counterbalancing force through cable 48 on the weight of the equipment on the front of frame 12. The counterbalancing action decreases the weight of the heavy equipment on the gauge wheels 40. This minimizes the possibility of the gauge wheels digging into the ground and causing the cane harvester to be come stuck. Also, the counterbalancing action decreases the force required on cable 24 to lift the front portion of the frame 12.

Referring particularly to FIGS. 3, 6 and 7, a pair of pick-up chains 56 and 58 are mounted on the front of the frame between rotatable discs 32 and 34. A third pick-up chain 60 is mounted outwardly of disc 34 and also on the front of the frame 12. A pick-up roller 62 having a plurality of equally spaced longitudinal vanes 64 is mounted across the front of the frame to pick up cane cut by the cutters on the rotatable discs 32 and 34.

The cut cane is transferred to the inclined conveyor housing 66 by a drum 68 (see FIG. 6) mounted across the frame 12 between the pick-up roller 62 and the conveyor housing 66. The drum 68 has a plurality of equally spaced apart longitudinal flutes 70 adapted to aid in the transfer of cane from the pick-up rollers 62 to the inclined conveyor housing 66. Any portion of the cut cane extending beyond the right side of the harvester (extending to the left looking at FIG. 3), is cut by a side cutter 72 (see FIG. 1).

The discs 32 and 34 are preferable turned in the same direction tending to move the cane toward the left side (right side looking at FIG. 3) of the cane harvester as it is cut. The conveyors within the conveyor housing 66 move laterally across the harvester to move the cut cane to the side of the harvester. A screw conveyor 74 may be mounted above the cutting discs 32 and 34 in a position to move the tops of the cane in the same lateral direction as the rotating discs move the cane if this is desired. Thus, as the cane is being cut the cutters, the screw conveyor, and the conveyors in housing 66 move the cane laterally toward the left of the harvester. This provides a very efficient and convenient way for cutting the cane and moving it to the side of the harvester where the cane is piled.

Referring to FIG. 1 and FIG. 6, it can be seen that a support member 76 extends upwardly from the frame 12. The support member is spaced from and behind the pick-up roller 62. The pivotal connection 78 pivotally connects the invlined conveyor housing 66 to the support member 76.

Three equally spaced parallel conveyor chains 80 are mounted within the conveyor housing 66. Each chain has upstanding projections 82 extending out from the conveyor housing. A hydraulic motor 84 (see FIG. 1) synchronously operates the conveyor chains by means of a shaft operated by the hydraulic motor and about which the conveyor chains are mounted. The chains are rotated in a direction such that the projections 82 move the cut cane to the left side of the tractor.

Referring to FIG. 1, it can be seen that the housing 66 is supported at the back by a hydraulic cylinder 86 interconnecting the cross bar 22 and the conveyor housing 66. The conveyor housing 66 can be moved by a hydraulic ram (not shown) extending from hydraulic cylinder 86 from a lower rearward inclination of say about 35° or a 40° angle to the horizontal to an upper forward position of say about 125° or 135° angle to the horizontal. Thus, the inclination of the inclined conveyor housing 66 can be adjusted to accommodate cane of different inclination as it stands in the fields. If the cane is inclined away from the front of the mechanism, it would not fall as far back on the conveyor and the conveyor needs to be in a more upright or forward of upright position. If the cane is inclined toward the machine as the machine moves forward, then the conveyor should be adjusted to a more nearly horizontal position.

Forwardly inclined mast 88 extends upwardly from the left side of the frame 12. Forwardly inclined mast 90 extends upwardly from the right side of the frame 12. Booms 92 and 94 are pivotally and slidably mounted on masts 88 and 90, respectively.

Figure 5:
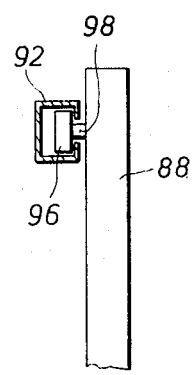
FIG. 5 is a view partly in section taken along line 5—5 of FIG. 4.

You will see by referring to FIG. 5 that the boom 92 is hollow. A knob 96 having a knob stem 98 extends from adjacent the upper part of mast 88. The knob 96 is confined within the hollow of the boom 92. The boom 92 is also provided with an elongate slot 100. The knob stem 98 of mast 88 serves as a support along which the slot 100 may slide.

The boom 92 may be pivoted about the knob 96. Also, the elongate slot 100 on boom 92 may be slid along the knob stem 98 thus permitting the movement of the end of boom 92 further away from mast 88 to effectively extend the boom or permit the movement of the end of boom 92 toward the mast 88 to effectively retract the end of the boom 92.

Boom 92 is pivoted on mast 88 hydraulically by the use of the hydraulic ram 102 extending from hydraulic cylinder 104. Similarly boom 94 is pivoted on mast 90 by means of hydraulically operated ram 106 extending from hydraulic cylinder 108 (see FIG. 2). Boom 92 is extended and retracted by hydraulic ram 110 extending from hydraulic cylinder 112 and boom 94 is extended and retracted by hydraulic ram 111 extending from cylinder 113.

Referring to FIG. 3, it can be seen that a screw conveyor support 114 having downwardly extending portions 116 and 118 is connected on the ends of booms 92 and 94. The ends of screw conveyor 74 are journaled in downwardly extending portions 116 and 118 of conveyor support 114. A plurality of protrusions 120 extend outwardly from the screw conveyor 74. The screw conveyor 74 with its protrusions 120 is adapted upon rotation of the screw conveyor, to engage the tops of cane and move the tops of the cane laterally to the left of the harvester and thus in the same direction as the lateral movement of the cane on the inclined conveyor housing 66. However, under at least some condition it has been found undesirable and in such conditions obviously should be omitted.

All of the elements of the harvester supported in front of the tractor are either mechanically or hydraulically operated with the means for operating them controlled by the operator sitting on the tractor. The power for operating the mechanical and hydraulic members is taken from the tractor power take-off. A tractor power take-off chain (not shown) is located in the tractor power take-off chain protector housing 122 (see FIG. 2). The tractor power take-off chain rotates the line shaft 124 which extends longitudinally along substantially the entire length of the tractor. Line shaft 124 is connected by a universal joint 126 to gear box 128. Sprocket wheel 130 drives chain 132 which in turn drives the main sprocket wheel 134. Main sprocket wheel 134 drives chain 136 which in turn drives the roller sprocket wheel 138 which rotates pick-up roller 62. The roller sprocket wheel 138 drives chain 140 which in turn drives the drum sprocket wheel 142 which rotates drum 68.

The main sprocket wheel 134 also drives chain 144 which in turn drives the side cutter sprocket wheel 146 which rotates the side cutter and operates pick-up chain 60.

Hydraulic pumps 148 are mounted on the tractor and operated by belts 150. Fluid is pumped from the hydraulic pumps 148 through hoses (not shown) to the various hydraulically operated motors and other hydraulic equipment. Hydraulic motor 84 (see FIG. 1) operates the chain conveyors 80. Hydraulic motor 152 (see FIG. 2) operates screw conveyor chain 154 which in turn rotates the screw conveyor 74. Motor 156 (see FIG. 6) is connected to gear box 158 (see FIG. 7) by universal joint 160. A chain 162 connects gear box sprocket wheel 164 and the disc sprocket wheel 166 for rotating the cutter disc 32. A hydraulic motor (not shown) is also connected to universal joint 168 which operates shaft 170 leading to gear box 172. A chain 174 connects gear box sprocket wheel 176 and disc sprocket wheel 178 rotating the cutter disc 34.

A clutch 180 (see FIG. 2) is used for engaging the tractor power take-off and the line shaft 124 and is positioned so that disengagement of the clutch stops the mechanically operated members and the hydraulic pumps. Thus the operator in the case of an emergency or for some other reason may stop the operation of all of the harvesting equipment merely by disengaging the clutch 180.

In operation, the operator activates the hydraulic system to move hydraulic ram 28 to the right looking at FIG. 1 thereby causing cable 24 to lift the forward end of the frame 12 off the ground. The counterbalance force created by the heavy platform 42 and the ballast 46 acting through cable 48 aids in the upward movement of the forward part of the frame. When the operator is ready to cut cane, the hydraulic ram 28 is operated to lower the gauge wheels 40, (which determine the height of the cutting discs) to the ground.

The operator then moves the tractor forward while operating the mechanical and hydraulic equipment through engaging the clutch 180 to connect the line shaft 124 with the power take-off in the tractor. The cane is cut by the cutters on discs 32 and 34 and given a lateral push toward the left side of the harvester. Also, as the cane is being cut, the screw conveyor 74 moves the tops of the cane toward the left side of the tractor. The operator will adjust the position of the screw conveyor 74 with respect to the disc 32 and 34 hydraulically. The pivotal and slidable booms permit the operator to hydraulically move the screw conveyor forward, backward, upward, and downward relative to the position of the cutter blades.

The cut cane is picked up by pick-up chains 56, 58, and 60 and pick-up roller 62 and then transferred by rotatable drum 68 to the inclined conveyor housing 66. Any cane extending outwardly to the right of the harvester is severed by the side cutter 72.

As the harvester moves forward cutting the two rows of cane simultaneously, the operator may vary the inclination of the inclined conveyor housing 66 hydraulically to accommodate cane of different inclination as it stands in the field. The unique coupling connecting the rear cross piece of the frame 12 with the drawbar pin 20 automatically allows frame 12 to pivot or slant or rotate sideways a certain amount about the horizontal position of the drawbar pin as the harvester runs across various field elevations or rows of cane of different heights. The counterbalancing force acting on cable 48 also minimizes the chances of the gauge wheels 40 digging deeply into the ground and thus minimizes the chances of the entire harvesting mechanism becoming stuck.

When the operator desires to stop harvesting, he merely disengages clutch 180 and all moving parts on the harvester cease operating. The operator activates hydraulic cylinder 30 to lift up the forward end, and then moves the tractor to the next location for the next harvesting operation.

From the foregoing it will be seen that this invention is one well adapted to attain all of the ends and objects hereinabove set forth, together with other advantages which are obvious and which are inherent to the apparatus.

The invention having been described, what is claimed is:

1. In a cane harvester system comprising a tractor, and harvesting equipment the improvement of: means for supporting the harvesting equipment in front of the tractor including a frame surrounding the tractor and having a cross piece at the rear of the tractor, the cross piece being universally pivotally connected to the rear of the tractor in a manner such that the rear of the tractor propels the means for supporting the harvesting equipment and the means for supporting the harvesting equipment may pivot upwardly and downwardly and slant from side to side.

2. A cane harvesting system in accordance with claim 1 wherein the cross piece has an opening and a coupling member extending vertically the rear of the tractor fits loosely in the opening.

3. A cane harvesting system in accordance with claim 2 wherein the opening in the cross piece is a slot extending vertically through the cross piece and the coupling member is a drawbar pin extending through the slot.

4. A cane harvesting system in accordance with claim 3 wherein the means for supporting the harvesting equipment in front of the tractor includes a frame extending entirely around the tractor and having a cross member transversely of and adjacent the front of the tractor and connected thereto by a vertical guide and a swivelling slide interengaging each other and carried one by the tractor and the other by the cross member.

5. In a cane harvesting system comprising a tractor, and a support with harvesting equipment on the forward portion thereof universally pivotally attached to the tractor the improvement of: a cable attached to the support forwardly from the pivotal attachment, and means on the tractor operatively associated with the cable for lifting and lowering the forward portion of the support.

6. A cane harvesting system in accordance with claim 5 wherein the means operatively associated with the cable are hydraulic means.

7. A cane harvesting system in accordance with claim 5 wherein; a second cable is attached to the forward portion of the support and a counterbalance is connected to the second cable whereby the counterbalance aids in supporting the forward portion of the support and decreases the required lifting force of the lifting and lowering cable.

8. A cane harvesting system in accordance with claim 7 wherein the counterbalance comprises a platform pivoted to and extending rearwardly from the tractor and ballast on the platform.

9. In a cane harvesting system comprising a tractor, a support pivotally and slantingly attached to the tractor and extending forwardly from the tractor, and harvesting equipment supported on the forward portion of the support including cane cutting means mounted on the front of the support the improvement of: at least three laterally spaced gauge wheels pivotally mounted on the support for gauging the height of the cane cutting means, and means for individually adjusting the pivotal positions of the gauge wheels.

10. A cane harvesting system in accordance with claim 9 wherein a cable is attached to the forward portion of the support, and a counterbalance is connected to the cable to minimize digging of the gauge wheels into the ground during the harvesting.

11. A cane harvesting system in accordance with claim 10, wherein the counterbalance comprises a heavy platform extending rearwardly from the tractor and heavy ballast on the tractor.

12. In a cane harvester comprising a support, cutters mounted on the support, and cane pick-up means mounted on the support, the improvement of an inclined cane conveyor pivotally mounted on a pivot member on and relative to the support behind the pick-up means, said inclined conveyor also pivotally mounted relative to both said cutters and said pick-up means and adapted to move cut cane laterally to the side of the harvester.

13. A cane harvester in accordance with claim 12 wherein a screw conveyor is supported on the support at a position above the cutters and adapted to move the tops of the cane laterally in the same direction as the lateral movement of the cane on the inclined cane conveyor, the support being in the form of a frame, with a mast extending upwardly from each side of the frame, and a boom extending forwardly from each mast and pivotally mounted on said masts, respectively, and the screw conveyor is mounted on said booms, a pivot member connected to each mast and extending into a slot formed in the corresponding boom, the booms pivotally and reciprocally moveable by hydraulic means interconnecting the masts and the booms, and the hydraulic means being adapted to move the ends of the booms inwardly toward the masts and outwardly from the masts.

14. A cane harvester in accordance with claim 12, wherein a hydraulic ram is connected to the conveyor and is reciprocable within a hydraulic cylinder connected to the support to vary the inclination of the inclined conveyor.

15. In a cane harvesting system comprising a tractor, a support extending in front of the tractor and supporting cane cutting means, cane pick-up means, and means for moving cut cane to the side of the tractor, the improvement of: mechanical means for operating at least one of said cane cutting means, said cane pick-up means, and said means for moving cut cane to the side of the tractor, hydraulic means for operating the rest of said cane cutting means, said cane pick-up means, and said means for moving cut cane to the side of the tractor, a line shaft driven by the tractor power take-off and operatively associated with said mechanical means and said hydraulic means, and a clutch means common to and connecting the tractor power take-off and the line shaft, whereby disengagement of the clutch causes both the mechanical means and the hydraulic means to stop.

16. A cane harvesting system in accordance with claim 15 wherein the mechanical means operates the cane pick-up means and the hydraulic means operates the cane cutting means and the means for moving cut cane to the side of the tractor.

* * * * *

UNITED STATES PATENT OFFICE
CERTIFICATE OF CORRECTION

Patent No. 3,665,686  Dated May 30, 1972

Inventor(s) Richard A. Duncan

It is certified that error appears in the above-identified patent and that said Letters Patent are hereby corrected as shown below:

Claim 2, line 3, "extending vertically" should read --on--.

Signed and sealed this 23rd day of January 1973.

(SEAL)
Attest:

EDWARD M. FLETCHER, JR.  
Attesting Officer

ROBERT GOTTSCHALK  
Commissioner of Patents